US005239672A

United States Patent [19]

Kurby et al.

[11] Patent Number: 5,239,672

[45] Date of Patent: Aug. 24, 1993

[54] SYNCHRONIZATION METHOD AND APPARATUS FOR SIMULCAST TRANSMISSION SYSTEM

[75] Inventors: Christopher N. Kurby, Elmhurst; John P. Monson, Hoffman Estates; Krsman Martinovich, Schaumburg; David G. Wiatrowski, Gurnee, all of Ill.

[73] Assignee: Motorola, Inc., Schaumburg, Ill.

[21] Appl. No.: 723,126

[22] Filed: Jun. 28, 1991

[51] Int. Cl.[5] ............................................... H04B 7/14

[52] U.S. Cl. ..................................... 455/16; 455/51.2; 455/57.1; 455/70

[58] Field of Search ................. 375/107; 455/16, 51.1, 455/51.2, 57.1, 68, 70

[56] References Cited

U.S. PATENT DOCUMENTS 4,231,114 10/1980 Dolikian ............................ 375/107

4,369,443 1/1983 Giallanza et al. .................... 455/70

5,060,240 10/1991 Erickson et al. .................. 455/51.2

5,117,424 5/1992 Cohen et al. ...................... 455/51.1

5,128,971 7/1992 Johnson ........................... 455/51.1

*Primary Examiner*—Reinhard J. Eisenzopf

*Assistant Examiner*—Timothy H. Keough

*Attorney, Agent, or Firm*—James A. Coffing; Joseph P. Krause; Steven G. Parmelee

[57] ABSTRACT

A method of synchronizing a plurality of remote site transmitters (200) in a digital simulcast transmission system is described that enables use of four-level modulation on two-level modulation systems. A synchronization signal is transmitted at a predetermined data rate from a prime site, which signal might include a synchronization pattern having a first and a second portion. The first portion of the synchronization pattern is used for synchronization, while the second portion indicates the completion of the first portion. The method includes detecting (205, 320) of the first portion of the synchronization pattern. Each remote site transmitter (200) further has a modulation clock having a phase polarity which is selected (215, 324) in response to the detection of the first portion of the synchronization signal.

18 Claims, 5 Drawing Sheets

-PRIOR ART-

-PRIOR ART-

-PRIOR ART-

SYNCHRONIZATION METHOD AND APPARATUS FOR SIMULCAST TRANSMISSION SYSTEM

FIELD OF THE INVENTION

The present invention relates generally to simulcast transmission systems, and more particularly to a synchronization method and apparatus for remote site transmitters operating in such systems.

BACKGROUND OF THE INVENTION

The use of simulcast transmission to increase the effective radio frequency (RF) coverage area of land mobile radio communications systems is well known in the art. In simulcast transmission, two or more transmitters, simultaneously broadcasting identical information on the same frequency, are geographically located such that contiguous coverage is available over a larger area than can be covered by one transmitter acting alone. In order to insure that identical signals broadcast from separate transmitters do not interfere with each other, most simulcast transmission systems require that the base band signals be transmitted at a precisely controlled time from all of the remote site transmitters. If the signal is transmitted from one of the transmitters at the wrong time, distortion might occur in the area where signals from both transmitters are received. Such distortion might occur if identical signals from two or more transmitters arrive at a receiver, at slightly different times, thereby slightly out-of-phase with respect to each other. Furthermore, in order for a received simulcast signal to be intelligible, the remote site transmitters must all be modulated with substantially the same signal at substantially the same point in time. That is, the remote sites must all be synchronized with respect to each other.

In general, a simulcast system is comprised of a prime site, multiple remote transmitter sites, and subscriber units. A modulated signal is sent, typically via a microwave distribution network, from the prime site to the remote transmitter sites. At the remote site, if the information the prime site is distributing is digital information, the digital data is recovered using any of a variety of known clock recovery schemes. After recovering the data, transmission of the data from the remote sites must then be synchronized for simultaneous transmission from all the remote sites. After synchronization, the remote sites transmit a modulated signal to the subscriber unit in the simulcast coverage areas.

Todays simulcast systems that broadcast digital information on an FM carrier, $F_c$, typically utilize a binary, or two level modulation scheme wherein for example, a binary digit of one, having a predetermined bit time, might be represented by an RF signal having the same bit time at a frequency equal to $F_c+4000$ Hz. and a binary zero might be represented by an RF signal having the same bit time at a frequency equal to $F_c-4000$ Hz. Such a two-level modulation scheme involves modulating a carrier between two frequencies, such as the two aforementioned frequencies, $F_c+4000$ and $F_c-4000$, for discrete periods of time, wherein each bit time of the data stream is represented by a corresponding amount of time and a corresponding frequency.

When using a two level modulation scheme, the synchronization is typically achieved by using finite time delays between the prime site and the remote sites, each of which time delay is programmed into the remote site transmitters. That is, the remote sites, which receive the data and then recover it, will each wait a predetermined amount of time before transmitting the data to the subscriber. This fixed time delay, which varies amongst the remote sites, attempts to insure simultaneous transmission of the data, but can only achieve simultaneous transmission within a predetermined tolerance level. So long as the data is properly recovered at the remote site and synchronized with the local clock at the transmitter site, any synchronization of the remote sites with each other, which is not accounted for by accurate delay parameters, will be innocuous with respect to the intelligibility of the received signal.

The aforementioned synchronization scheme is adequate for two level modulation systems because the transmitter's modulation is not particularly sensitive to individual bit pairs, or di-bits, in the signal to be broadcast. However, two level modulation systems are limited in their simulcast performance, since the delay tolerance is directly related to the bit time. In contrast, a four level modulation scheme may be used to extend the delay tolerance of the system, because the delay tolerance capability is directly related to twice the bit time (i.e., di-bit, or symbol, time). In a four-level modulation system, digital bits in a stream of such information are grouped into bit pairs. Since there are at most four combinations of ones and zeroes in a pair of ones and zeroes (i.e., 00, 01, 10, 11), paired ones and zeroes in a stream of such data can be mapped into four modulation levels. Instead of having two frequencies to represent two digits, (i.e. 0 and 1), four frequencies are used to represent the four possible combinations of one's and zeroes in pairs of such digits. For example, $F_c+4000$ might represent binary 10; $F_c+2000$ might represent binary 11; $F_c-2000$ might represent binary 01; and $F_c-4000$ might represent binary 00. When using a four-level modulation, the time that the modulated carrier signal is at a particular frequency is ordinarily twice the bit time of the bits from the underlying data stream because two bits from the data stream are being mapped into one of four modulation levels. In a four level scheme however, the synchronization of the ones and zeroes of the data becomes a critical parameter for a successful simulcast transmission. This is due to the fact that, in addition, to clock/data recovery, each of the remote site transmitters must modulate the same two-bit pairs at precisely the same time in order to produce an intelligible, four level transmission.

Four level data in a four-level modulation system is typically grey coded (i.e., only one bit in adjacent levels is permitted to change its binary state), which coding rules are shown in Table 1.

TABLE 1

| Level | Binary Code | Grey Code |
|---|---|---|
| 1 | 00 | 00 |
| 2 | 01 | 01 |
| 3 | 10 | 11 |
| 4 | 11 | 10 |

FIG. 1A shows a binary data stream 100 which may be grey coded in accordance with the rules set forth in Table 1. Binary data stream 150 is simply the grey coded equivalent of binary data stream 100. The binary data of data stream 100 is first partitioned into two-bit pairs, 102–112, which are then grey coded into pairs 102′–112′. FIG. 1B shows a mapping diagram 180, which illustrates how data stream 100 could appear as a grey coded, four level, amplitude modulated signal. (Pictorially showing FM modulation levels or deviation levels is not readily accomplished.) In a four-level modulation system, each transmitter must broadcast precisely the same signal shown in this mapping diagram for the simulcast transmission from each of the remote sites to be intelligible.

FIG. 1C shows a mapping diagram 190 illustrating the consequences of improper bit-pair modulation. In FIG. 1C, synchronization is off by one bit position. Even if the data in the data stream is fully recovered and synchronized to the respective internal clocks at each remote site, each remote site must begin bit pair modulation on the same bit, and as shown in FIG. 1C, on bit pair 102. As an example, suppose that a remote site A modulates the binary data stream 150, generating the mapping diagram shown in FIG. 1B. Alternatively, a second remote site B begins the mapping process on an odd numbered bit, resulting in the mapping diagram 190 shown in FIG. 1C. When these two modulated signals are launched from their respective remote site transmitters, the received signal in the simulcast coverage area might be unintelligible. In contrast to the two level case where such a modulation error simply causes a signal phase anomaly (i.e., transmission begins one or more clock pulses later), in a four level modulation scheme the error has a much greater impact. In particular, the modulated data stream transmitted by remote site A (data pairs 102'-112') is drastically different from that transmitted from remote site B (bit pairs 103-111). A subscriber in the simulcast coverage area might simultaneously receive the modulated signals 180 and 190, but would only recover unintelligible audio.

Existing microwave distribution methods typically transport either a waveform in the case of analog signals, or a two level modulated signal in the case of digital microwave. The actual transport signal used on analog microwave systems is a two level signal. Although it is possible for an analog system to transport a four level waveform, there is presently no equipment available to perform a two-level to four-level encoding at the prime site. In using a four-level modulation it would be highly desirable to have existing, single transport signals useable for both two-level and four-level signals. Since existing digital microwave systems generally transport only a two level signal, an improved synchronization method is required so that two level signals can be properly modulated onto a four level transport signal.

Accordingly, there exists a need for a synchronization scheme which may be employed by a remote site transmitter and a simulcast transmission system which transmits binary data in a four level modulated form. Such a scheme should also be compatible with two level simulcast transmission systems, while not being limited to exclude those systems which may partially employ four level modulation.

SUMMARY OF THE INVENTION

The present invention encompasses a method of synchronizing a plurality of remote site transmitters in a simulcast transmission system. A signal is transmitted at a predetermined data rate from a prime site, which signal includes a synchronization pattern having a first and a second portion. The first portion of the synchronization pattern is used for remote site synchronization, while the second portion indicates the completion of the first portion. In one embodiment, the method is performed by temporarily storing a received signal, and detecting of the first portion of the synchronization pattern in the stored signal. Each remote site transmitter typically has a modulation clock which has a single phase polarity that is selected in response to the detection of the first portion of the synchronization signal.

DETAILED DESCRIPTION OF A PREFERRED EMBODIMENT

Use of a two level transport mechanism to transmit a four level signal presents the problem of correctly determining which two pairs of bits in a stream of such bits, are to be mapped to one of four levels at the remote site. The present invention solves this unique problem by introducing a binary synchronization pattern of ones and zeroes prior to the two level data. Since it is only important to know which two bits in the data stream to map, the synchronization pattern can be kept very simple. A periodic pattern of alternating 1's and 0's (i.e., 1-0-1-0-1-0-1-0, . . . , hereinafter referred to as di-bit sync), was selected such that it becomes necessary only to select the correct 1-0 bit pair (i.e., di-bits) to be mapped to a four level signal. In four level modulation, a continuous, periodic 1-0 pattern is mapped to one fixed, four level value, commonly referred to as a DC level. A long duration of DC is not desirable in simulcast transmission systems, since the lack of data transitions may hinder clock recovery in downstream receivers. To prevent this problem, the path to the FM modulator is muted until another, closing sequence, appended to the 1-0 synchronization sequence (hereinafter referred to as sync tail) is detected in the received signal at the receiver. The sync-tail pattern chosen for the closing sequence is an inverted version of the synchronization pattern (i.e., 0-1-0-1-0-1. . .). This was selected because it is relatively simple to detect, once di-bit sync is detected. In the preferred embodiment of the present invention, the synchronization sequence (di-bit sync) is approximately 46.66 milliseconds in duration, while the sync tail is approximately 6 milliseconds in duration.

Figures 1A, 1B, 1C:
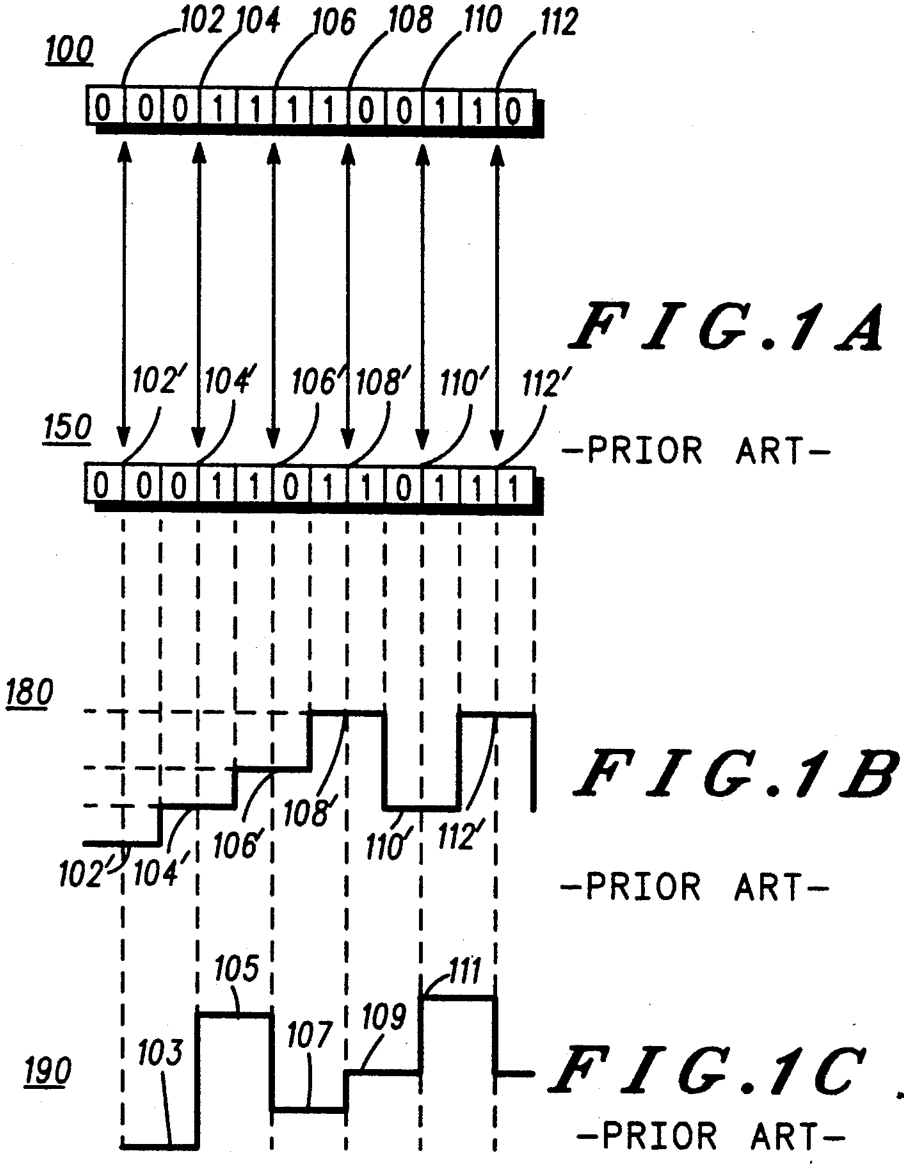
FIG. 1A shows a random binary data sequence having data pairs which are grey coded to produce a grey coded data sequence, which grey coding process is known in the art.
FIG. 1B shows a correctly mapped level diagram for the grey coded data sequence of FIG. 1A.
FIG. 1C shows an incorrectly mapped level diagram for the grey coded data sequence of FIG. 1A.
Figure 2A:
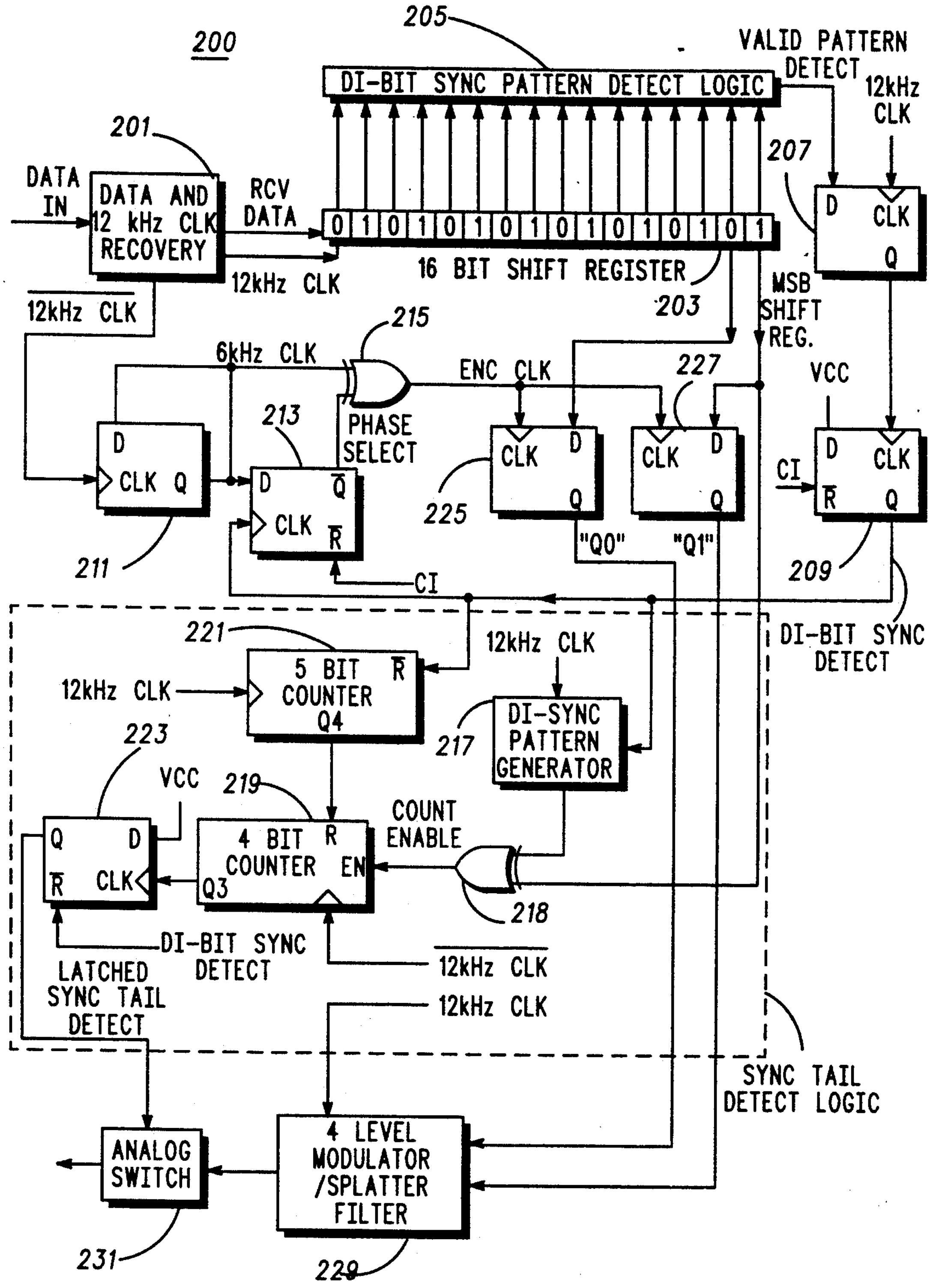
FIG. 2A is a schematic diagram depicting one embodiment of the present invention.

FIG. 2A shows a schematic diagram 200 of mostly CMOS logic devices used to implement the present invention. Diagram 200 details the implementation utilized in the remote delay module (RDM) to detect the synchronization sequence sent from the prime site to the remote site. Inbound data, which is known to be at a 12 kHz. rate, is recovered, and locked to a 12 kHz clock within the data and clock recovery block 201. The 12 kHz. clock within the data and clock recovery block 201 is locked to the incoming data edges. A low-going clock edge occurs when an incoming zero-crossing edge occurs. (What is desired is alignment of the rising edge of the 12 kHz. clock to the center of the incoming data bits. It follows then that the falling edge of the 12 kHz. clock will align with the zero crossings of the incoming data stream.) The recovered data is buffered, or temporarily stored, in a 16 bit shift register 203 at the aforementioned data rate (12 kHz). It was calculated that at a 5% bit error rate (BER) on the microwave link, at a 12 kHz. data rate, that the probability of falsely detecting the di-bit sync sequence of alternating ones and zeroes is less than $1\times10^{-10}$, and hence is not a limiting factor in the reliability of a simulcast system using the embodiment shown in FIG. 2A. Valid pattern detect logic 205, which is comprised of 16 parallel lines, each corresponding to a bit in register 203, are coupled to a 16-input AND gate.

Figure 2B:
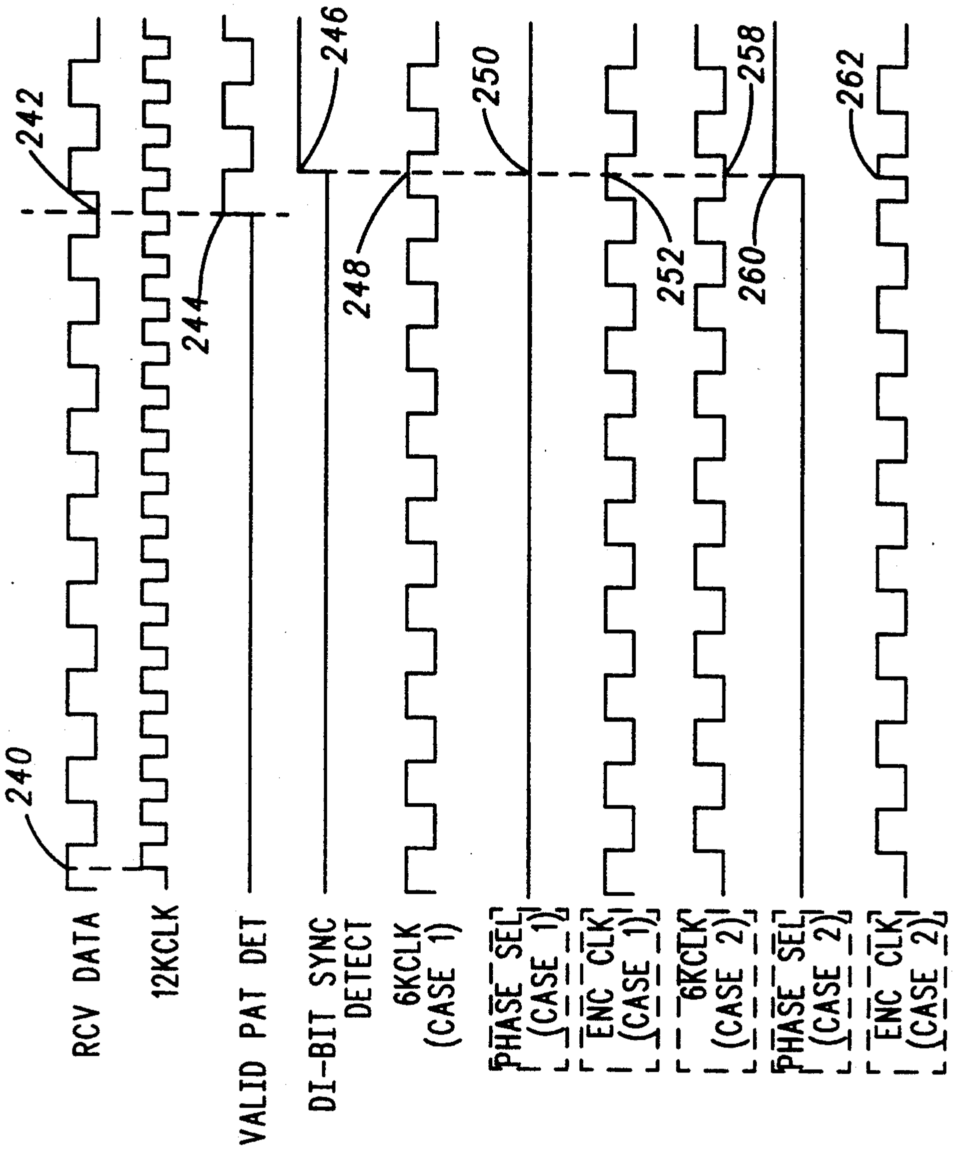
FIG. 2B is a timing diagram showing the temporal relationship among some of the signals shown in the schematic diagram of FIG. 2A.

FIG. 2B shows a timing diagram which serves to illustrate signal transitions within circuitry shown in schematic diagram 200. Starting with bit 240 in the received data stream, register 203 stores the di-bit sync pattern until bit 242 is clocked into the least significant bit of shift register 203. At this time, the valid pattern detect line from the sync pattern detect logic is forced high at 244. Flip-flops 207 and 209 latch the di-bit sync detect line (the output of latch 209) so that it remains high while the code indicate (CI) control signal is active. (It should be noted that the code indicate signal is generated at the prime site and is used to drive the detection schemes at the remote sites. In particular, the code indicate signal is used to control the muting and unmuting of the audio output of the RDM, as later described, so that the synchronization sequences are not transmitted with the rest of the voice data.)

Once di-bit sync has been detected as evidence by the state of the di-bit sync detect line from latch 209, the latched output of flip-flop 213 is used to determine the correct modulation clock phase polarity, and also to enable the sync tail detect logic. Since the two level, 12 kbps data is to be modulated to a four level transport signal, the data must be clocked, or buffered, into the modulator in pairs of bits, at half the incoming data rate (i.e., 6 kHz). A 6 kHz clock is generated using flip-flop 211, which has as its input the inverted recovered 12 kHz. clock pulse, obtained from the data and clock recovery block 201. Generating the 6 kHz. clock has an inherent problem associated with it, particularly when an identical clock phase of the 6 kHz. clock with respect to the 12 kHz clock is desired using independent flip-flops (e.g., at each remote site). In particular, the initial state (e.g., upon power-up) of flip-flop 211 will determine the resulting phase of the 6 kHz clock pulse. This can result in opposing clock polarities at two or more of the remote sites; a predictable, yet undesirable condition for which a remedy is needed. This remedy, which helps to illustrate a requisite step of a preferred embodiment of the present invention, is described below.

As mentioned earlier, a critical aspect of a synchronization method which is used in a four level modulation scheme is modulating, or mapping, the same di-bit pairs across all the remote site transmitters. Accordingly, the modulation clock pulse used to drive flip-flops 225, 227, which flop-flops outputs are coupled to the 4 level modulator filter 229, and hence determining which di-bit pairs to be modulated, must have the same phase polarity as the 12 kHz. data clock, at the instant di-bit sync is detected. If not, the data in the shift register 203 is clocked in to the modulator, on the next rising edge of the 12 kHz. clock, at least one half-clock cycle later than the 6 kHz. clock. Shift register 203 is, however, being continuously loaded with incoming data bits at the prescribed data rate, or 12 kbps. Therefore, the additional half clock cycle of the 6 kHz. clock causes the data in the shift register 203 to be shifted, resulting in the mapping of incorrect di-bit pairs. To avoid this problem, the correct phase polarity for the modulation clock pulse (the 6 kHz. clock) must be generated using flip-flop 213 and XOR gate 215.

Returning to FIG. 2B, two cases are shown to illustrate how the phase selection circuitry of a preferred embodiment operates. Case 1 shows a particular, but arbitrary, phase of the 6 kHz clock, whereby the clock is high at 248 (i.e., the instant di-bit sync detect goes high at 246). The phase select line at the output of flip-flop 213 (e.g., Q-bar) assumes the inverse of the previous state of input D. Since input D, which is the 6 kHz clock pulse, is high at the instant previous to 248, the phase select line remains low. As a result, XOR gate 215 behaves like a direct line, simply passing the value of the other input (e.g., the 6 kHz clock). The encoded clock line at the output of XOR gate 215, then is simply the 6 kHz clock pulse with the same phase, resulting in the correct mapping of the two most significant bits of shift register 203.

In the preferred embodiment of the present invention, the preferred state of the encoded clock at the instant di-bit sync is detected, is a high state. This ensures that the next clock transition will be a falling edge, thereby buffering, using flip-flops 225, 227, the most significant bit pairs from register 203, without additional shifting caused by a rising edge. To illustrate this, Case 2 in FIG. 2B shows a 6 kHz clock having an opposite phase polarity as shown in Case 1. The instant di-bit sync is detected at 246, the 6 kHz clock is in a logic low state at 258. Accordingly, the phase select line goes high at 260, effectively transforming XOR gate 215 to a NOT gate, or inverter. This results in an encoded clock pulse having an inverted phase polarity with respect to the 6 kHz clock, beginning at 262. In short, if the encoded clock, or modulation clock, polarity is correct, it should transition from low to high while the 16 bit shift register 203 contains a valid di-bit sync pattern (i.e., transition low to high before the next shift register bit shift). If this is true, then the correct pair of di-bits will be latched (i.e., Q1=1, Q0=0) from the shift register 203 and subsequently be sent to the four level modulator/splatter filter 229. If the 6 kHz clock state is low, then the clock polarity is incorrect and must be inverted via the XOR gate. The encoder clock polarity decision is locked until the end of the secure call (i.e., until code indicate goes inactive).

The sync tail detection circuitry consists of a di-bit sync pattern generator 217, 5 bit counter 221, 4 bit counter 219, sync tail detect latch 223, and an XOR gate 218. The di-bit sync pattern generator 217 will generate a continuous pattern which is synchronized with the di-bit sync pattern (i.e., 1-0-1-0-1-0, . . . ) received at the beginning of the call. The most significant bit (i.e., oldest bit) is compared with the di-bit sync pattern generators output, using XOR gate 218. The four bit counter 219 connected to the output of XOR gate 218 is enabled (i.e., incremented) each time a received bit does not match the di-bit sync pattern bit, which condition indicates that sync tail has been detected. The five bit counter 221 is used to reset the four bit counter 219 every 16 clock cycles. If the four bit counter counts eight mismatches out of 16 received bits, then the sync tail detect latch 223 is triggered. Once sync tail detect has occurred, the RDM coded audio path is unmuted, via the analog switch 231 at the output of the four level modulator/splatter filter 229.

Figure 3A:
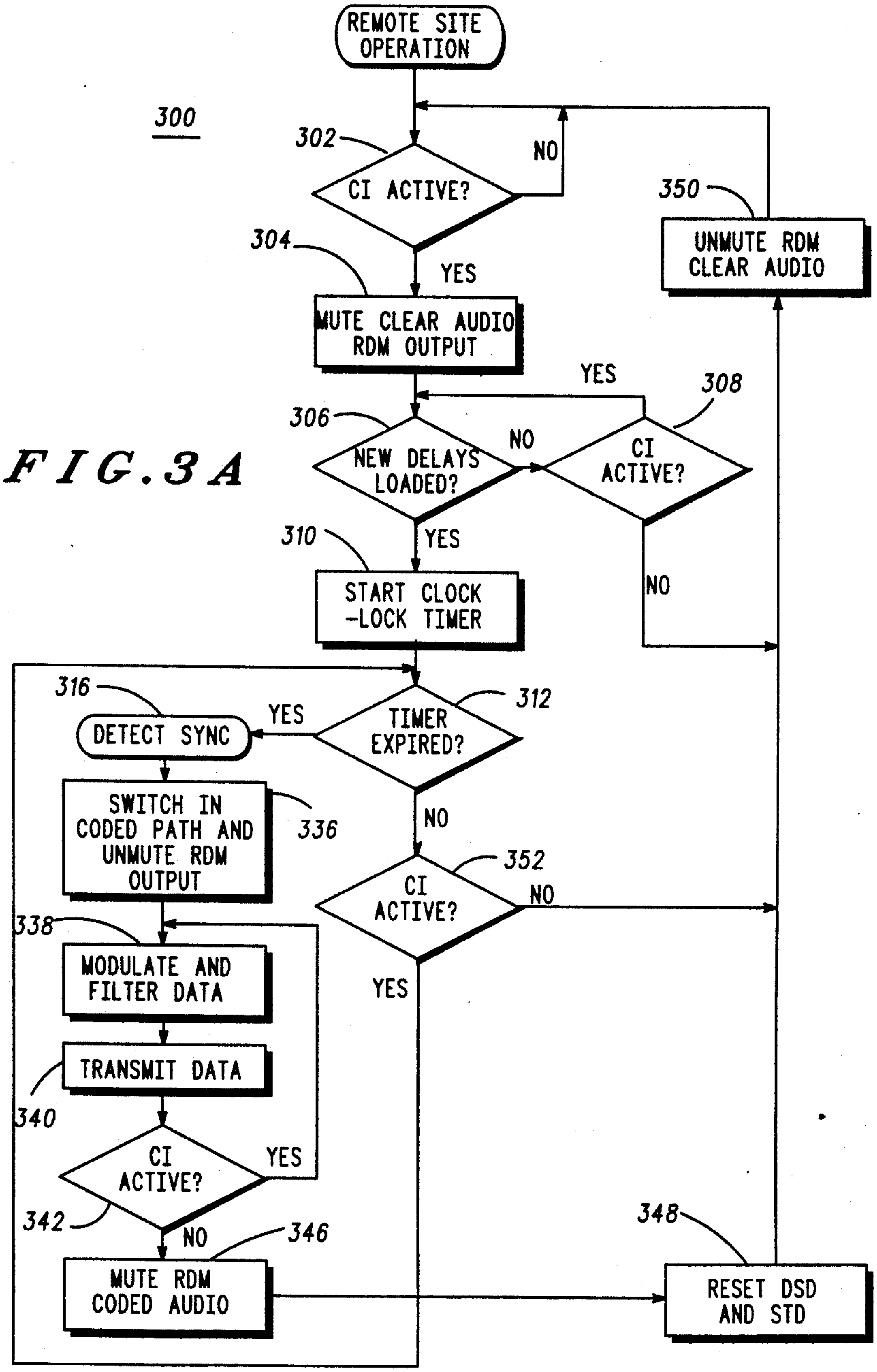
FIG. 3A is a flow diagram depicting the operation of the remote site transmitters, in accordance with one embodiment of the present invention.

FIG. 3A shows a simplified flow diagram 300 of the remote site operation in accordance with the present invention. The routine begins with a decision at 302 which determines whether or not the code indicate (CI) line is active. If not, the routine remains idle until CI becomes active. When CI is active, the clear audio RDM output is muted at 304, preventing the subscriber from hearing the synchronization pattern data at the beginning of each message. A decision is then reached at 306 which determines whether or not delay adjustments have been loaded in to the RDM. This typically happens during the time in which the clock is being recovered (e.g., on the order to 10 milliseconds out of the 46.6 millisecond synchronization burst), but it may not occur until further into the synchronization data stream. If new delays have not been loaded, a decision is reached at 308 which determines whether or not code indicate is still active. If CI is active, the routine again checks to see if the new delays have been loaded at 306. If CI is not active, the RDM clear audio output is unmuted at 350 and the RDM goes into the idle state, as previously described. After delays have been loaded into the RDM, the clock lock timer is started at 310. As mentioned earlier, clock lock generally takes on the order of 10 milliseconds. Accordingly, a 9.3 millisecond timer is used in the preferred embodiment of the invention, to delay looking for sync until the clock is locked. Once the clock lock timer has been started at 310, a decision is reached at 312 to determine whether or not the clock-lock timer has expired, indicating that the clock has had sufficient time to lock on to the incoming data. If the timer has not expired, another check of the code indicate state occurs at 352. If CI is active, the routine returns to determine whether or not the timer has expired. If CI is inactive, the RDM clear audio is unmuted at 350, and the RDM goes into the aforementioned idle state. When the timer has expired, indicating the clock has been locked to the incoming data, the RDM attempts to detect at 316 the synchronization pattern, which process is later described. Once the end of the synchronization pattern has been detected, the coded audio path is switched in and the RDM output is unmuted at 336. The grey coded data, as previously described, is then four level modulated at 338 and filtered using known splatter filter techniques. The data is then transmitted at 340 assuming that code indicate remains active, during which time the routine continues to modulate, filter, and transmit the data using a four level modulated signal. When code indicate goes inactive, the RDM coded audio is muted at 346, the di-bit sync detect and sync tail detect circuitry is reset at 348, the RDM clear audio is unmuted at 350, and the RDM returns to the idle state.

Figure 3B:
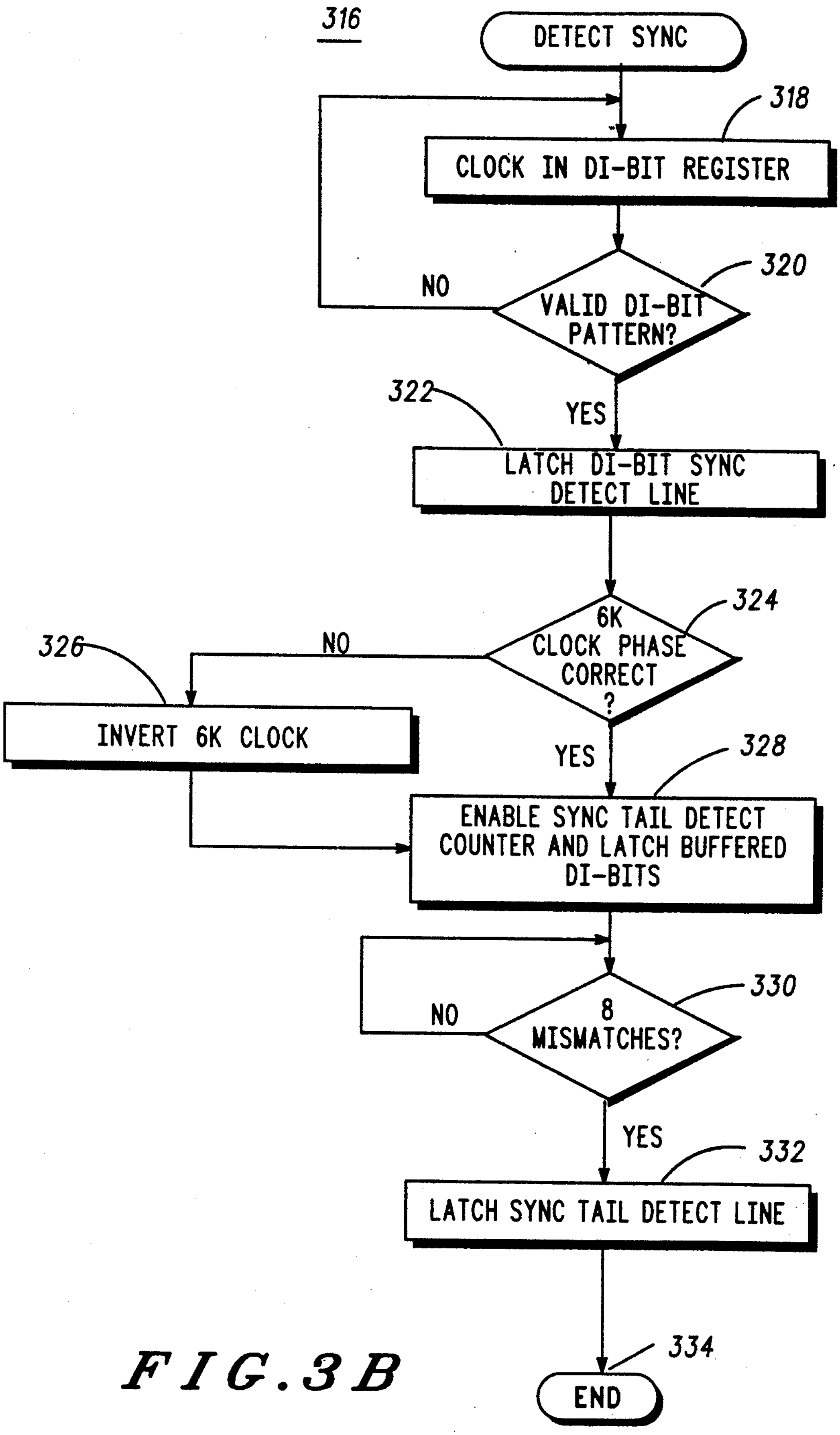
FIG. 3B is a flow diagram depicting, in more detail, one of the operational steps of FIG. 3A.

FIG. 3B shows a more detailed flow diagram of the detect sync operation 316. The recovered data is clocked in at 318 to the 16 bit di-bit shift register 203, shown in FIG. 2A. A decision is then reached at 320 to determine whether or not a valid di-bit pattern has been detected. If not, the data continues to be clocked in using the 12 kHz system clock. If a valid di-bit synchronization pattern is detected, the di-bit sync detect line is latched at 322. This is done using the flip-flops 207, 209 shown in FIG. 2A. The half rate (e.g., 6 kHz) clock phase is then monitored at 326 to determine whether or not the polarity is correct. If it is determined that the 6 K clock phase is incorrect (i.e., at a logic low level at the instant di-bit sync is detected), the 6 kHz clock is inverted at 326. This is accomplished using the XOR gate 215 and the phase select line shown in FIG. 2A, and earlier described. If the 6 kHz clock phase is determined to be correct, the sync tail detect counter is enabled at 328 and the buffered di-bit pairs are latched. The data latching is done using the flip-flops 225, 227 and are triggered by the encoded clock output, both shown in FIG. 2A. A decision is then reached at 330 which determines whether or not there have been eight successive mismatches, which condition indicates that the sync tail has been detected. Until eight mismatches are found, the RDM continues to count mismatches using the four bit counter 219 shown in FIG. 2A. As soon as eight mismatches have been detected, the sync tail detect line is latched at 332, using flip-flop 223 and the di-bit sync detect line shown in FIG. 2A. The routine is then exited at 334.

It should be noted that, though the present invention is embodied in logic circuitry as in FIG. 2A, alternate hardware, firmware, or software embodiments may be anticipated. While the preferred embodiment of the implementation of FIG. 2A used TTL and other commonly available circuitry, alternate embodiments of the implementation of the embodiment would include using a suitable digital signal processor (DSP) as well as any microprocessor or microcontroller capable of performing at least the detection of the sync pattern and for selecting which phase of the modulation clock to use.

What is claimed is:

1. In a simulcast transmission system having a prime site and a plurality of remote site transmitters, a method for synchronizing the plurality of remote site transmitters with each other, using a received asynchronous data signal that, from time to time, includes a synchronization sequence having a first and a second pattern, the data signal being modulated to a first level and transmitted from the prime site at a predetermined data rate, the first pattern being used for synchronization, the second pattern indicating completion of the first pattern, each of the plurality of remote site transmitters having a system clock operating at a frequency substantially equal to the predetermined data rate and a modulation clock pulse, the modulation clock pulse having at least a first and second phase polarity, the method comprising the steps of, at each of the plurality of remote site transmitters:

detecting, in the received signal, the first pattern of the synchronization sequence;

selecting, responsive to said step of detecting the first pattern, the first phase polarity for the modulation clock pulse; and buffering, responsive to the step of selecting, particular portions of the data signal for modulation to a second level.

2. A method for synchronizing in accordance with claim 1, further comprising the step of, at each of the remote site transmitters, storing the received signal.

3. A method for synchronizing in accordance with claim 2, wherein the step of buffering further comprises the step of, at each of the remote site transmitters, buffering di-bit pairs of said stored signal into a four level modulator.

4. A method for synchronizing in accordance with claim 1, further comprising the step of, at each of the remote site transmitters, detecting the second pattern of the synchronization sequence.

5. A method for synchronizing in accordance with claim 1, further comprising the step of, at each of the remote site transmitters, receiving a control signal from the prime site, said control signal indicating that the received signal contains a synchronization sequence.

6. A method for synchronizing in accordance with claim 5, wherein said step of detecting the first pattern is responsive to said control signal.

7. A method for synchronizing in accordance with claim 5, wherein said step of selecting the first phase polarity is responsive to said received control signal.

8. In a simulcast transmission system having a prime site and a plurality of remote site transmitters, a method for synchronizing the plurality of remote site transmitters with each other, using a received asynchronous data signal that, from time to time, includes a synchronization sequence having a first and a second pattern, the received signal being two-level modulated and transmitted from the prime site at a first data rate and having a plurality of binary data values, the first portion being used for synchronization, the second portion indicating completion of the first portion, each remote site transmitter having a system clock operating at a frequency substantially equal to the predetermined data rate, each remote site further having a modulation clock pulse having at least a first and a second phase polarity for buffering di-bit pairs of the received signal into a four level modulator, the method comprising the steps of, at each of the plurality of remote site transmitters:

receiving a control signal from the prime site, said control signal indicating that the received signal contains a synchronization sequence;

detecting, in the received signal, the first pattern of the synchronization sequence; and selecting, responsive to said step of detecting the first pattern, the first phase polarity for the modulation clock pulse.

9. A method for synchronizing in accordance with claim 8, further comprising the step of, at each of the remote site transmitters, detecting the second pattern of the synchronization pattern.

10. A method for synchronizing in accordance with claim 8, further comprising the step of, at each of the remote site transmitters, dividing the system clock frequency by two, to produce the modulation clock pulse.

11. A method for synchronizing in accordance with claim 8, wherein said step of detecting the first pattern is responsive to said received control signal.

12. A method for synchronizing in accordance with claim 8, wherein said step of selecting the first phase polarity is further responsive to said received control signal.

13. A remote site transmitter in a simulcast transmission system, which system includes a prime site and a plurality of such remote site transmitters requiring synchronization with each other, the remote site transmitter receiving an asynchronous data signal that, from time to time includes a synchronization sequence having a first and a second pattern, the received signal being two-level modulated and transmitted from the prime site at a first data rate and having a plurality of binary data values, the first pattern being used for synchronization, the second pattern indicating completion of the first pattern, the remote site transmitter having a system clock operating at a frequency substantially equal to the predetermined data rate and a modulation clock pulse having at least a first and second phase polarity, the remote site transmitter comprising:

means for detecting, in the received signal, the first pattern of the synchronization sequence; and means for selecting, coupled to said means for detecting the first pattern, the first phase polarity for the modulation clock pulse; and means for buffering, coupled to said means for selecting, di-bit pairs of the data signal for inputting to a four-level modulator.

14. A remote site transmitter in accordance with claim 13, further comprising means for storing the received signal.

15. A remote site transmitter in accordance with claim 13, further comprising means for detecting the second pattern of the synchronization pattern.

16. A remote site transmitter in accordance with claim 13, further comprising means for receiving a control signal from the prime site, said control signal indicating that the received signal contains a synchronization sequence.

17. A remote site transmitter in accordance with claim 16, wherein said means for detecting the first pattern is responsive to said received control signal.

18. A remote site transmitter in accordance with claim 16, wherein said means for selecting the first phase polarity is responsive to said received control signal.

* * * * *